(12) United States Patent
Sung

(10) Patent No.: US 6,340,148 B1
(45) Date of Patent: Jan. 22, 2002

(54) VALVE HANDLE FOR PREVENTING A VALVE FROM BEING ACCIDENTALLY TURNED ON

(75) Inventor: Kuo-Wei Sung, Chungli (TW)

(73) Assignee: United Microelectronics Corp., Hsin-Chu (TW)

( * ) Notice: Subject to any disclaimer, the term of this patent is extended or adjusted under 35 U.S.C. 154(b) by 0 days.

(21) Appl. No.: 09/651,582

(22) Filed: Aug. 29, 2000

(51) Int. Cl.$^7$ .......................... F16K 35/00; F16K 31/44; F16K 31/00
(52) U.S. Cl. .......................... 251/96; 251/215; 251/296; 251/335.2
(58) Field of Search .......................... 251/96, 215, 296, 251/335.2

(56) References Cited

U.S. PATENT DOCUMENTS

| | | | | |
|---|---|---|---|---|
| 3,193,243 A | * | 7/1965 | Billington et al. | |
| 4,456,222 A | * | 6/1984 | Shen | 251/230 |
| 4,960,218 A | * | 10/1990 | Toida et al. | 215/311 |
| 5,026,026 A | * | 6/1991 | Sever et al. | 251/230 |
| 6,195,819 B1 | * | 3/2001 | Wang | 4/689 |

* cited by examiner

Primary Examiner—Joseph A. Kaufman
Assistant Examiner—David A Bonderer
(74) Attorney, Agent, or Firm—Wintson Hsu

(57) ABSTRACT

The present invention relates to a valve handle for preventing a valve from being accidentally turned on. In the preferred embodiment of the present invention, the valve handle comprises a fixing ring which mobilizes the valve stem, so as to drive the stem up and down, the fixing ring having at least one stopper; and the valve handle has a knob housing that covers and mobilizes the fixing ring, and has at last one protrusion having a first perpendicular plane and a slant plane. The slant plane and the perpendicular plane work with the stoppers on the fixing ring to ensure that the valve can be easily closed but is difficult to open.

12 Claims, 3 Drawing Sheets

VALVE HANDLE FOR PREVENTING A VALVE FROM BEING ACCIDENTALLY TURNED ON

BACKGROUND OF INVENTION

1. Field of the Invention

The present invention relates to an improved valve handle, more particularly, to a valve handle that prevents a valve from being accidentally turned on.

2. Description of the Prior Art

In the process of semiconductor wafer production, various kinds of gasses are required at each stage of the manufacturing process. For instance, in a CVD process, the commonly used gasses are $SiH_4$, $B_2H_6$, $NH_3$, and hydrogen gas; in a dry etching process, the gases used are $CF_4$, $CHF_3$, oxygen, and $SF_6$; and in an ion implantation the gases used are $PH_3$, $BF_3$, other frequently used inert gases, etc. Some of these gases are toxic, like $PH_3$ and $BF_3$; some are explosive, such as $SiH_4$, with a threshold limit value (TLV) of 0.5 ppm and an explosive energy that is 6 times greater than the conventional explosive TNT. A well designed gas-transportation system for delivering processing gases is mandatory for each wafer production process, and the design of the gas-transportation system will vary with the characteristics of the various types of gases. When dealing with toxic or explosive processing gases, extreme care must be taken to avoid explosions or poisonings due to leaking gas.

Valves are the most commonly seen aspect of a gas transportation system. The purpose of the valves is to control the gas flow, so it is indispensable in the entire production system: from the gas source through many transportation routes, to the reactor and then to an exhaust. Valves can be grouped into two categories based on use: 1) ON/Off type and 2) adjustable type. An ON/OFF valve is used to stop gas flow under certain conditions, such as during maintenance of transportation routes.

Please refer to FIG. 1. FIG. 1 is a partial view of a cross-section of a valve used in wafer production processes according to the prior art. As shown here, the valve is a typical diaphragm valve commonly found on the market. The flow control of a processing gas for the valve 10 takes place between the flow passages 21 and 22. Briefly, gas flow control is achieved by a valve base 31, which is made from poly-chloro-trifluoroethlene (PCTFE), and by a diaphragm 32, both of which are located in the vicinity of the opening of the flow passage 21. The diaphragm 32 moves up and down to open and close the flow passage 21, and the up and down movement is driven by the stem 41 and the handle 42.

The stem 41 and the handle 42 of the conventional valve 10 are fastened together with bolts or by welding. As an operator turns the handle 42, the stem 41 moves up or down, which mobilizes the diaphragm 32, to which the stem 41 is connected, so as to turn on or off the valve 10. For instance, when the operator turns the handle 42 clockwise, the diaphragm 32 moves down and stops the flow of the processing gas. Conversely, when the operator turns the handle counterclockwise, the diaphragm goes up and thus turns on the valve 10. However, although the on/off state is displayed on the handle 42 of the diaphragm valve 10, mistakenly turning on a valve in some section of the gas transportation system occurs, and not infrequently in a wafer production factory that has hundreds or thousands of valves. As toxic or explosive processing gases can escape into the air due to an improper valve state (i.e., open or closed), the safety of the working environment the lives of workers are put at risk.

SUMMARY OF THE INVENTION

It is therefore a primary objective of this invention to provide an improved manual valve to solve the problem described above.

Another objective of the invention is to provide a valve handle that prevents the valve from being accidentally turned on so as to ensure the safety of the working environment.

In the preferred embodiment of the present invention, a valve handle, which prevents a valve from being mistakenly turned on, has a fixing ring for driving a stem up and down, the fixing ring having at least one stopper. The valve handle also has a knob housing that covers and turns the fixing ring. The knob housing has at least one protrusion located on a top inner side of the housing that works with the stopper of the fixing ring. The protrusion comprises a first perpendicular plane and a slant plane.

When an operator turns the knob housing in a first turning direction, the first perpendicular plane pushes the stopper, causing the fixing ring to turn in the first turning direction and simultaneously making the stem descend, placing the valve in an OFF state. When an operator turns the knob housing in a second turning direction, the slant plane slides past the stopper, and so is unable to move the fixing ring, and the valve at this time cannot be turned to an ON state.

It is a benefit of the present invention that the interaction of the perpendicular and slant planes prevents the valve of the valve from being easily opened. Hence, the valve is less likely to be mistakenly opened by an operator, and thus the dangerous leakage of gasses associated with such mistakenly opened valves can be avoided.

These and other objectives of the present invention will no doubt become obvious to those of ordinary skill in the art after reading the following detailed description of the preferred embodiment, which is illustrated in the various figures and drawings.

DETAILED DESCRIPTION OF THE PREFERRED EMBODIMENT

The following is the detailed description of the present invention with the aid of the drawings. Although a manual diaphragm valve is used in the preferred embodiment, the invention is not limited to such valve types. Other kinds of valves that are turned on or off by turning a valve handle are included in the range of the present invention. The present invention can be applied to many manual valves, such as gate valves, needle valves, ball valves, global valves, butterfly valves, etc. to render extra protection to these valves.

Figure 1:
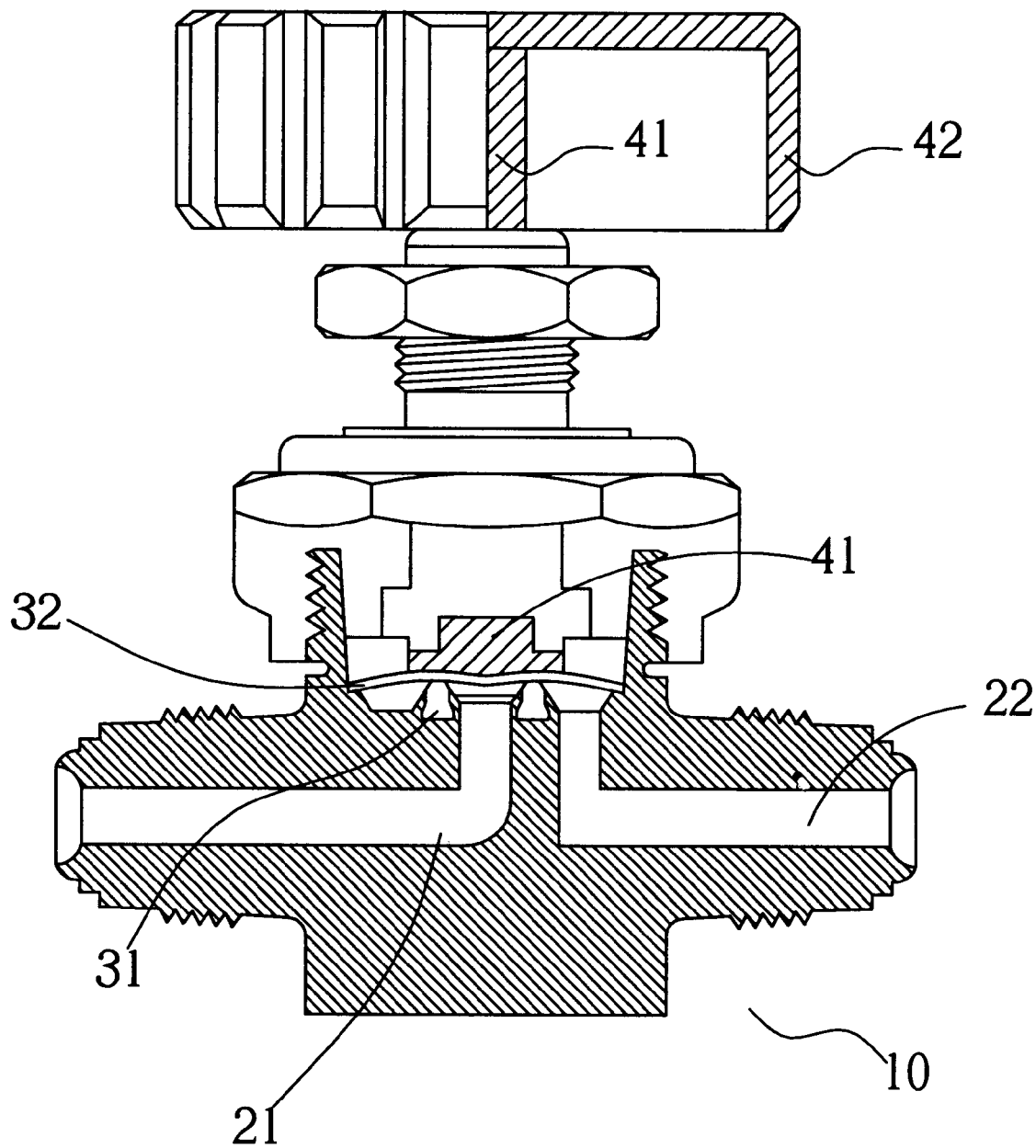
FIG. 1 is a cross-sectional view of a prior art valve.
Figure 2:
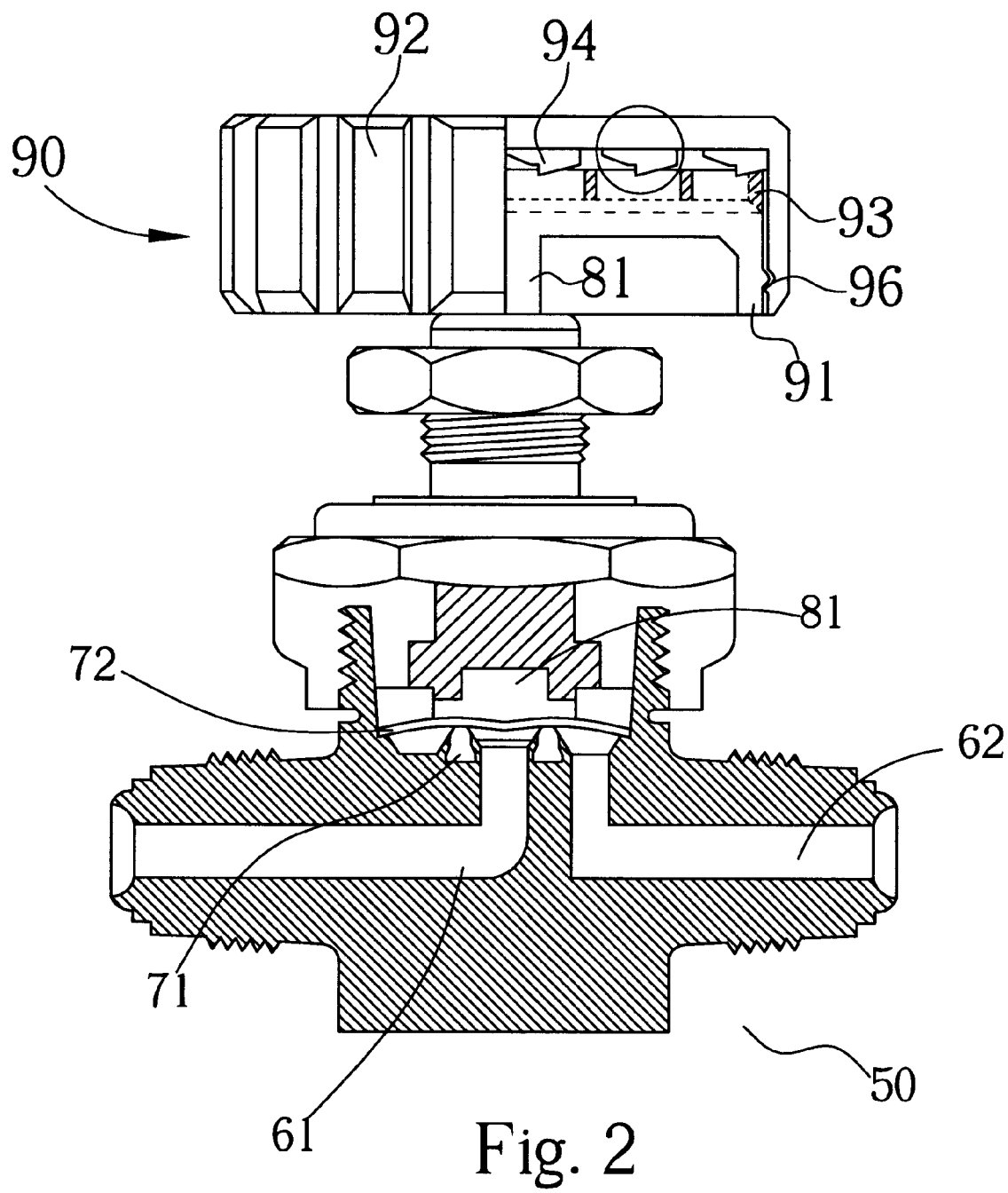
FIG. 2 is a cross-sectional view of a present invention valve.

Please refer to FIG. 2. FIG. 2 is a cross-sectional view of a valve 50 for wafer production according to the present invention. As shown in FIG. 2, the structure of the valve 50 is similar to that of a conventional diaphragm valve (see FIG. 1). The valve 50 comprises a flow passage 61 and a flow passage 62, and controls the flow of a processing gas passing between the flow passage 61 and the flow passage 62. The operation of a valve base 71, located around the opening of the flow passage 61, and a diaphragm 72 control the flow of the gas. An up and down movement of the diaphragm 72, driven by a stem 81, opens and closes the flow passage 61.

In the preferred embodiment, the main feature of the valve 50 is its valve handle 90, which comprises a fixing ring 91 for driving the stem 81 up or down, and a knob housing 92 that covers and mobilizes the fixing ring 91. The knob housing 92 and the fixing ring 91 are linked by a Carton structure 96 so that they do not separate from each other. The material of the fixing ring 91 can be the same as that of the stem 81, such as SS316 stainless steel or any other hard material that is not easily deformed. The fixing ring 91 has 8 evenly distributed stoppers 93 around the circumference of the fixing ring 91. The knob housing has 8 protrusions 94 distributed around its top inner side. It should be noted that in other embodiments, the number of the protrusions 94 depends on their size, and not necessarily be 8. The number of the stoppers 93 depends upon the number of protrusions 94. What is most important is that there be at least one stopper 93 that works with one protrusion 94.

Figure 3:
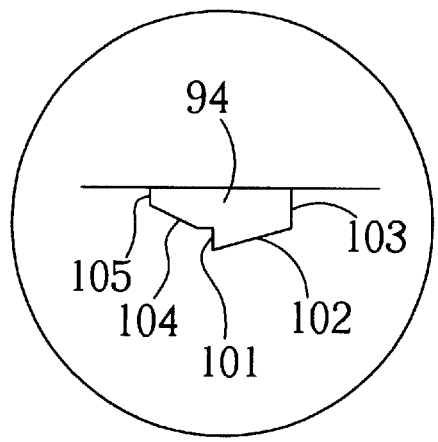
FIG. 3 is the enlarged drawing of the protrusion in the right hand corner of FIG. 2.

Please refer to FIG. 3. FIG. 3 is the enlarged drawing of the protrusion 94 in the right hand corner of FIG. 2. As shown here, each protrusion 94 comprises a perpendicular plane 101 and a slant plane 102, both of which work with the stoppers 93 of the fixing ring 91. The slant plane 102 is angled at 10 to 45 degrees. Beside these planes, the protrusion 94 comprises a second perpendicular plane 103 and a second slant plane 104, and a third perpendicular plane 105. The perpendicular plane 103 is located between the top inner side of the knob housing 92 and the slant plane 102. When the operator turns the knob housing clockwise, the perpendicular plane 101 pushes the stoppers 93 and moves the fixing ring 91 clockwise. This causes the stem 81 to descend, and the valve 50 is placed in a closed state. Conversely, as the operator turns the knob housing 91 counterclockwise, the slant plane 102 slips past the stoppers 93 of the fixing ring 91, and so is unable to move the fixing ring. The valve 50 thus cannot be turned on at this time.

Figure 4:
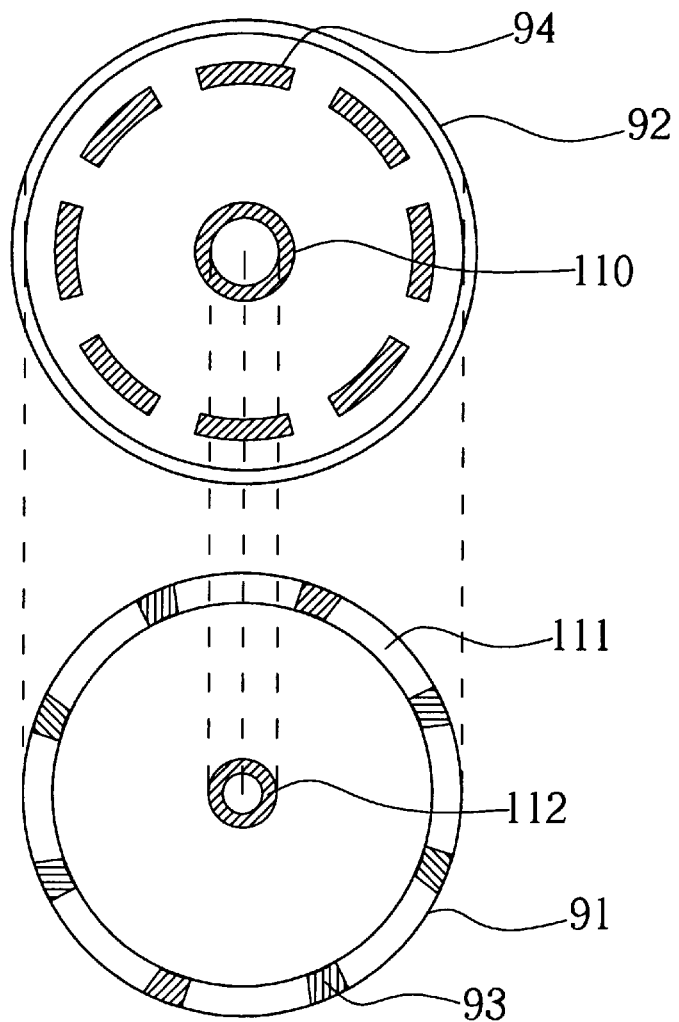
FIG. 4 is a view of a top inner side of a knob housing and a fixing ring of a valve of the present invention.

Please refer to FIG. 4. FIG. 4 is a view of the top inner side of the knob housing 92 and the fixing ring 91. As shown here, the 8 protrusions 94 are evenly distributed around the top inner side of the knob housing 92. The knob housing 92 is jointed with the fixing ring 91, the 8 protrusions 94 falling into the spaces 111 which separate the stoppers 93 from each other. At the center of the top inner side of the knob housing is a supporter 110, which supports the knob housing 92. At the center of the fixing ring 91 is a cylinder 112 with an outer diameter less than the inner diameter of the supporter 110; the cylinder 112 facilitates the revolving motion of the knob housing 92. It should be noted that the supporter 110 should be high enough so that the perpendicular planes 103 of the protrusions 94 are lightly higher than the highest point of the stoppers 93, when the knob housing 92 is under no external force.

To turn on the valve 50, the operator needs only to apply a downward force to the knob housing 92, and simultaneously rotate the knob housing 92 counterclockwise. This forces the perpendicular planes 103 of the protrusions 94 lower than the highest point of the stoppers 93. The perpendicular planes 103 then engage with the stoppers 93 and rotate the fixing ring 91 and the stem 81, making the stem 81 ascend, The material of the knob housing 92 may be of stainless steel, PC or other equally elastic materials that are difficult to deform.

In other embodiments of the present invention, the ON and OFF states of the valve 50 may be designed to depend on other turning directions. That is, the clockwise turning direction could be ON, and the counterclockwise turning direction OFF. This is done by changing the relative positions of the slant plane 102 and the perpendicular plane 101 of the protrusions 94, and by changing the direction of the bolt track between the stem 91 and the body.

In comparison with the conventional valve, the present invention provides an improved manual valve comprising a valve handle 90 that prevents the valve 50 from being mistakenly turned on and therefore maintains the safety of the semiconductor processing industrial environment. As the operator turns the knob housing 92 clockwise, the fixing ring 91 would moves clockwise, making the stem 81 descend, and the valve 50 is placed in the closing state. As the operator moves the knob housing 92 counterclockwise, the slant plane 102 of the protrusion 94 slips past the stoppers 93 on the fixing ring 91, and is unable to move the fixing ring 91, so the valve 50 cannot be mistakenly turned on.

The above disclosure is based on the preferred embodiment of the present invention. Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A valve handle that prevents the valve from being mistakenly turned on, the valve comprising:
   a fixing ring that mobilizes a valve stem and causes the valve stem to ascend or descend, the fixing ring having at least one stopper; and
   a knob housing that covers and drives the fixing ring, a top inner side of the knob housing having at least one protrusion that works with the stopper of the fixing ring, the protrusion having a first vertical plane, a second vertical plane and a slant plane;
   wherein as an operator turns the knob housing in a first direction, the first vertical plane pushes the stopper and moves the fixing ring in the first direction, making the stem descend to place the valve in a closed state; and as the operator turns the knob housing in a second direction, the slant plane slips past the stopper and so is unable to move the fixing ring so that the valve is difficult to turn to an open state; wherein the valve is turned to the open state by an operator pushing downward on the knob housing and simultaneously turning the knob in the second direction, causing the second vertical plane to interact with the stopper, moving the fixing ring and the stem so as to make the stem ascend.

2. The valve handle of claim 1 wherein the second vertical plane is located between the top inner side of the knob housing and the slant plane.

3. The valve handle of claim 1 wherein the first turning direction is clockwise and the second turning direction counterclockwise.

4. The valve handle of claim 1 where in a supporter is disposed within the center of the top inner side of the knob housing, the supporter supporting the knob housing so that the second vertical plane of the protrusion is higher than the stoppers under no external force.

5. The valve handle of claim 1 wherein the valve comprises a diaphragm valve, a gate vale, a ball valve, or a global valve.

6. The valve handle of claim 5 wherein the diaphragm valve is a manual diaphragm valve.

7. A valve handle comprising:
   a fixing ring that mobilizes a valve stem, causing the stem to ascend or descend, the fixing ring comprising at least one stopper; and
   a knob housing that covers and mobilizes the fixing ring, the knob housing having in a top inner side at least one protrusion that interacts with the stopper on the fixing ring, the protrusion comprising a first vertical plane and a second vertical plane in a first turning direction and a slant plane in a second turning direction;

wherein as an operator turns the knob housing in the first turning direction, the first vertical plane pushes the stopper, turning the fixing ring in the first turning direction so as to make the stem descend; and as the operator turns the knob housing in the second turning direction, the slant plane slips pass the stopper and is unable to move the fixing ring; wherein the valve is turned to an open state by pushing the knob housing downwards and simultaneously turning the knob in the second turning direction, causing the second vertical plane to interact with the stopper and mobilize the fixing ring and the stem, making the stem ascend.

8. The valve handle of claim 7 wherein the valve handle prevents the valve from being accidentally turned on.

9. The valve handle of claim 8 wherein the valve is a diaphragm valve, a gate valve, a ball valve or a global valve.

10. The valve handle of claim 7 wherein the second vertical plane is located between the top inner side of the knob housing and the slant plane.

11. The valve handle of claim 7 wherein the first turning direction is clockwise and the second turning direction counterclockwise.

12. The valve handle of claim 7 wherein the knob housing has a supporter in the top inner side, the supporter supporting the knob housing so that under no external force the second perpendicular plane of the protrusion is higher than the stopper.

* * * * *